Patented Oct. 22, 1935

2,018,397

UNITED STATES PATENT OFFICE 2,018,397

ANHYDROUS HYDROGEN FLUORIDE

William S. Calcott, Pennsgrove, N. J., and Lee Cone Holt, Edgemoor, Del., assignors to E. I. du Pont de Nemours & Company, Wilmington, Del., a corporation of Delaware No Drawing. Application August 15, 1933, Serial No. 685,246

13 Claims. (Cl. 23—153)

This invention relates to the preparation of anhydrous or water-free hydrogen fluoride, and this application is a continuation-in-part of our prior application Ser. No. 479,083, filed August 30, 1930.

Hydrogen fluoride in a crude state is, in general, prepared from calcium fluoride or fluorspar, $CaF_2$, and sulfuric acid. The reaction is quite simple:

$$CaF_2 + H_2SO_4 = CaSO_4 + 2HF$$

As commercially practiced, an intimate mixture of finely ground fluorspar with the theoretical amount of sulfuric acid, usually of 93 to 95% strength, is agitated and gradually heated to a final temperature of between 300 and 400° C. The evolved gases, which carry some sulfuric acid in the form of fluorsulfuric acid, some silicon tetrafluoride produced from any silica present in the fluorspar, and all the water present or formed in the reaction mass, are generally passed through one or more traps or other mist removing devices and then absorbed in water to form the ordinary aqueous hydrofluoric acid of commerce.

Anhydrous hydrogen fluoride has never been an article of commerce and has only been prepared in small quantities in scientific laboratories with great expenditure of effort and time. J. W. Mellor, in volume 2, page 128, of his "Comprehensive treatise on inorganic and theoretical chemistry" (1922) makes the following statement:

"According to E. Fremy's Recherches sur les fluorures (Ann. Chim. Phys. 47, 5, (1856)) the acid furnished by the action of sulfuric acid on fluorspar always contains water, sulfuric acid and other impurities. After many fruitless efforts to purify and dehydrate the crude material so obtained, he sought other means of preparation and found that anhydrous hydrofluoric acid could be satisfactorily obtained by heating well dried potassium hydrogen fluoride in a platinum retort attached to a platinum receiver which was cooled by immersion in a freezing mixture. The first portions which distilled over contained a little moisture."

Moissan used this method of making anhydrous hydrogen fluoride for his classical work on fluorine. (Compt. rend. 102, 1543, 103, 202, 256, 850.) All scientific workers who have studied problems requiring the use of anhydrous hydrogen fluoride since the time of Moissan have used the method of Fremy for the preparation of the anhydrous material.

Otto Ruff, in his book Die Chemie des Fluors (1920), states on page 31 (translation), if especially pure acid is required potassium hydrogen fluoride is prepared from the crude acid in a platinum dish. From this salt one half of the hydrofluoric acid is driven off in a platinum retort with a bulb and condenser.

In Gmelins Handbuch der anorganischen Chemie, 8 Auflage (1926) in leaflet System—Number 5—Fluor page 32F, the same directions, following the method of Fremy are given for preparing pure anhydrous hydrogen fluoride.

An interesting reference to American work is the article by Argo, Mathers, Humiston and Anderson, Transactions of American Electrochemical Society, 35, 340 (1919). In this article it is stated that the general method of making anhydrous hydrogen fluoride is to heat potassium hydrogen fluoride. On page 345 of the same article the authors discuss at some length the advantages of using sodium hydrogen fluoride in place of the potassium compound.

As late as the year of making application for patent on this invention, Ullmann, in his Enz. der. Tech. Chemie, 2te Auflage, Band 5, page 404 (1930) states in translation:

"To prepare pure anhydrous acid, hydrofluoric acid is converted into potassium hydrogen fluoride and again generated from this salt by heating."

Many other references could be given, in all of which the method of Fremy is followed in making anhydrous hydrogen fluoride. The prior art is, therefore, unanimous in describing the method of Fremy (first announced in 1856) as the only practical method of obtaining anhydrous hydrogen fluoride. The method is wasteful and expensive, for it involves the use of expensive potassium salts and expensive apparatus. It is also time and labor consuming, since the drying of potassium hydrogen fluoride to an anhydrous state is both difficult and slow. It further is complicated in that it requires the creation of the hydrofluoric acid, the destruction of the acid to form the double potassium salt, and a subsequent regeneration of the acid from the salt.

We have for the major object of our invention the preparation of anhydrous hydrogen fluoride by a process which is extremely simple, easily regulated and inexpensive. A further object is the elimination of the circuitous production of the potassium hydrogen fluoride and the uneconomical decomposition of this potassium salt with its maximum yield of hydrogen fluoride limited to 50%. Further objects will be readily apparent as our description proceeds.

These objects are accomplished by distilling crude hydrogen fluoride and passing the vapors therefrom through a properly controlled fractionating column. The impurities, the chief one of which is water, remain in the still or are condensed in the lower portions of the column, and the gas escaping from the top of the column is substantially anhydrous hydrogen fluoride.

In practicing our invention we find it advisable to make a strong hydrofluoric acid such as that produced by the reaction between concentrated sulfuric acid and fluorspar. The less water in the original crude hydrogen fluoride, the better is the yield of anhydrous hydrogen fluoride which can be obtained. For this reason we prefer to practice our process upon hydrogen fluoride which has been produced with a very small water content, such as is obtained when fluorspar is treated with sulfuric acid of about 97% strength. This is explainable by the fact that there is a constant boiling mixture of hydrogen fluoride and water which boils at 111° C. under 750 mm. pressure and in which hydrogen fluoride is present to the extent of about 43% (see von Duessen, Z. anorg. Chm. 49, 297 (1906)). The boiling point of this constant boiling mixture varies with the pressure, and under normal, unadjusted atmospheric pressure will be between 110 and 112° C. This mixture has the highest boiling point of any mixture of hydrogen fluoride and water under atmospheric pressure. In our specification and claims we have used the expression "relatively dilute" as defining mixtures of hydrogen fluoride and water or solutions of hydrogen fluoride and water. By this expression we wish to define mixtures or solutions in which the hydrogen fluoride is present in amounts between about 43% of the total mixture, as the lower limit, and about 97% of the total mixture, as the upper limit. With respect to anhydrous hydrogen fluoride, such solutions or mixtures of hydrogen fluoride which do contain water are, therefore, relatively dilute.

Where we are employing crude hydrogen fluoride in which the hydrogen fluoride is present in amounts within the upper ranges of our preferred limits, such as the crude hydrogen fluoride obtained by reacting fluorspar with concentrated sulfuric acid, it is not necessary to condense the gases before passing them into a still. The crude hydrogen fluoride gases can be passed directly into the still or into the base of a fractionating column over the still and the still will, therefore, serve as a receiver for the constant boiling mixture of hydrofluoric acid which is eventually separated out in the column. Under such conditions the production of the crude hydrogen fluoride can be made in a continuous process, and the purification of this crude hydrogen fluoride to produce anhydrous hydrogen fluoride can be made continuous.

The invention is best described by specific examples of its application.

Example I

Two thousand (2000) g. of a 96% hydrofluoric acid as obtained by condensing the gas produced by the reaction between fluorspar and sulfuric acid, is placed in a copper distilling flask. This flask is connected to a copper column 1" in internal diameter and about 20" high. This column is filled for a distance of 15" with a suitable hydrofluoric acid resisting packing, preferably broken pieces of carborundum. The column is surrounded by a cooling bath and is maintained at a temperature such that there is a slow but steady return flow thru the column. We have found a suitable temperature to be about 15° C. The gas emerging from the column top will have a temperature of 19 to 20° C., according to the barometric pressure. At about 760 mm. we have found the temperature to be about 19.5° C. and to remain very constant during an entire distillation.

The temperature of the crude hydrofluoric acid in the still is gradually raised till rapid boiling begins and the temperature as shown by a thermometer in the top of the column is about 19.5 C. The gas emerging from the top of the column is passed to a condenser and the liquid from the condenser to a cooled receiver. The distillation is ended when the temperature in the still reaches about 110° C. or very slightly below the boiling point of the constant boiling mixture. The amount and composition of the residue in the still will be determined by the temperature at which the distillation is ended. If the temperature is run to about 110° C. in the example above there will be about 150–160 g. of residue in the still having a content of about 50% hydrofluoric acid. If the distillation is stopped at 100° C. there will be about 200 g. of residue with a content of about 60% of hydrofluoric acid. The product gathered in the receiver will analyze by titration with standard sodium hydroxide solution as 99.8 to 100% hydrogen fluoride. Starting with 2000 g. of 96% material, 1800 to 1840 g. 100% hydrogen fluoride can be recovered in the distillate.

Example II

Five (5) pounds of a 96% hydrofluoric acid as obtained by condensing the gas produced by the reaction between fluorspar and sulfuric acid, is placed in an iron distilling vessel. This vessel is connected to an iron column 1¼" in internal diameter and about 22" high. This column is filled for a distance of 17" with a suitable hydrofluoric acid resisting packing, preferably broken pieces of carborundum. The column is surrounded by a cooling bath and is maintained at a temperature such that there is a slow but steady return flow thru the column. We have found a suitable temperature to be about 15° C. The gas emerging from the column top will have a temperature of 19 to 20 C., according to the barometric pressure.

At about 760 mm. we have found the temperature to be about 19.5° C. and to remain very constant during an entire distillation. The temperature of the crude hydrofluoric acid in the still is gradually raised till rapid boiling begins and the temperature as shown by a thermometer in the top of the column is about 19.5° C. The gas emerging from the top of the column is passed to a condenser and the liquid from the condenser to a cooled receiver. The distillation is ended when the temperature in the still reaches about 110° C. or very slightly below the boiling point of the constant boiling mixture. The amount and composition of the residue in the still will be determined by the temperature at which the distillation is ended. If the temperature is run to about 110° C. in the example above there will be about 150–160 g. of residue in the still having a content of about 50% hydrofluoric acid. If the distillation is stopped at 100° C. there will be about one-half pound of residue with a content of about 60% of hydrofluoric acid. The product gathered in the receiver will analyze by titration with standard sodium hydroxide solution as 99.8 to 100% hydrogen fluoride. Starting with 5 pounds of 96% material, 4.5 pounds to 4.55 pounds 100% hydrogen fluoride can be recovered in the distillate.

As illustrated above, it is possible to use hydrofluoric acid previously prepared by any process as a source of the anhydrous hydrogen fluoride. It is also possible, however, to conduct the vapors evolved from the reaction between calcium fluoride and sulfuric acid directly into a still for fractionation. Thus, in case it is desired to avoid condensing the crude hydrogen fluoride, the gases emerging directly from the reaction between fluospar and sulfuric acid are run to the still at the base of the column and the process carried on exactly as above.

1000 g. of finely ground fluorspar is mixed in an iron kettle with 1296 g. of 97% sulfuric acid. The kettle is closed and the outlet tube connected with the still at the base of the column. The column is kept at 15° C. as before and the temperature of the kettle gradually raised till the flow of hydrogen fluoride gas from it ceases. The temperature of the still at the base of the column is about 50° C., at the start of the run and is raised to about 110° C. at the close. There is obtained 410 to 415 g. of substantially anhydrous hydrogen fluoride analyzing 99.8 to 100%.

We do not wish to be limited to the exact methods of operation illustrated in the examples above, but include within the scope of our invention all obvious variations of procedure and equipment. The material used in the construction of the equipment need not necessarily be copper but may be other hydrofluoric acid resistant material. For operation on a large scale iron equipment has unexpectedly been found to be more satisfactory than copper. In addition, other types of fractionating column may be employed, for example, a plate column may be used instead of the packed column described above. A lagged column operating with a condenser to furnish the back flow may be employed instead of the cooled column described in the examples.

Moreover, super-atmospheric or sub-atmospheric pressures may be employed instead of the atmospheric pressure illustrated in the examples provided, however, that the temperature of the distillate is adjusted to compensate for the pressure.

It is obvious that our invention brings to an art which, since its inception in 1856, has labored under the handicap of an elaborate, complicated and expensive process, a method of preparing anhydrous hydrogen fluoride which is extremely simple, inexpensive and efficient.

Since many embodiments of this invention, differing widely in one or more respects, may be made without departing from the spirit of our invention, it is to be understood that we do not limit ourselves to the foregoing examples or description except as indicated in the following claims.

We claim:

1. The process of producing anhydrous hydrogen fluoride, which comprises heating in an iron still connected with a fractionating column under substantially atmospheric pressure a hydrogen fluoride solution containing more hydrogen fluoride than is present in a constant boiling mixture of hydrogen fluoride and water, maintaining the temperature of the emerging vapors at about 19°-20° C., condensing the emerging vapors and collecting the anhydrous fluoride until the temperature in the still bottom reaches about 110° C.

2. The process of producing anhydrous hydrogen fluoride, which comprises heating in a still connected with a fractionating column under substantially atmospheric pressure, hydrogen fluoride solution containing more hydrogen fluoride than is present in a constant boiling mixture thereof, maintaining the temperature of the emerging vapors at about 19 to 20° C., condensing the emerging vapors and collecting the anhydrous fluoride until the temperature in the still bottom reaches about 110° C.

3. The process of producing anhydrous hydrogen fluoride, which comprises heating in a still connected with an iron fractionating column under substantially atmospheric pressure an aqueous hydrogen fluoride solution containing more hydrogen fluoride than is present in a constant boiling mixture of hydrogen fluoride and water, maintaining the temperature of the emerging vapors at about 19°-20° C., condensing the emerging vapors and collecting the anhydrous fluoride until the temperature in the still bottom reaches about 110° C.

4. In the process of producing hydrofluoric acid from calcium fluoride and concentrated sulfuric acid, the steps which comprise passing the crude hydrofluoric acid vapors directly into a fractionating column and rectifying the crude hydrofluoric acid vapors containing more hydrogen fluoride than is present in a constant boiling mixture of hydrogen fluoride and water under atmospheric pressure, maintaining the temperature of the emerging vapors at about 19 to 20° C., condensing and collecting the distillate.

5. The process of producing substantially anhydrous hydrogen fluoride from a crude material which contains less water than the constant boiling mixture, comprising fractionally distilling such crude material from a still, the final temperature of which is brought to about the boiling point of the constant boiling mixture, and through a fractionating device so controlled that the exit gas from the same shall be at the temperature of the boiling point of anhydrous hydrogen fluoride.

6. The process of producing substantially anhydrous hydrogen fluoride which comprises passing a crude gas containing less than about 50% of water vapor by weight through a still, the temperature of which is brought to about the boiling point of the constant boiling mixture and through a fractionating device so controlled that the temperature of the exit gas shall be that of the boiling point of anhydrous hydrogen fluoride.

7. The process of producing substantially anhydrous hydrogen fluoride which comprises passing a crude gas containing less than about 50% of water vapor by weight through an iron still, the temperature of which is brought to about the boiling point of the constant boiling mixture and through a fractionating device so controlled that the temperature of the exit gas shall be that of the boiling point of anhydrous hydrogen fluoride.

8. The process of producing substantially anhydrous hydrogen fluoride which comprises generating a crude gas containing less than about 50% of water vapor by weight by the action of sulfuric acid upon a fluorine containing mineral and passing this gas through a still, the temperature of which is maintained at or slightly below the boiling point of the constant boiling mixture and through a fractionating device so controlled that the temperature of the exit gas shall be the boiling point of anhydrous hydrogen fluoride, the said crude gas being passed directly from the reaction chamber to the still.

9. The process of producing substantially anhydrous hydrogen fluoride which comprises continuously generating a crude gas containing less than about 50% of water vapor by weight by the continuous action of sulfuric acid upon a fluorine containing mineral and continuously passing this gas through a still, the temperature of which is maintained at or slightly below the boiling point of the constant boiling mixture and through a fractionating device so controlled that the temperature of the exit gas shall be the boiling point of anhydrous hydrogen fluoride, the said crude gas being passed directly from the reaction chamber to the still.

10. The process of producing substantially anhydrous hydrogen fluoride which comprises generating a crude gas containing 4 to 10% of water vapor by weight by the action of 95 to 97% sulfuric acid upon fluorspar and passing this gas through a still, the temperature of which is maintained at about 100 to 112° C., and through a fractionating column which is so controlled that the temperature of the exit gas shall be 19.5 to 20° C., the said crude gas being passed directly from the reaction chamber to the still.

11. In the process of producing hydrofluoric acid from calcium fluoride and concentrated sulfuric acid, the steps which comprise passing the crude hydrofluoric acid vapors directly into a fractionating column and rectifying the crude hydrofluoric acid vapors containing above 96% hydrogen fluoride under atmospheric pressure, maintaining the temperature of the emerging vapors at about 19 to 20° C., condensing and collecting the distillate.

12. The process of producing anhydrous hydrogen fluoride, which comprises heating in an iron still connected with an iron fractionating column under substantially atmospheric pressure, hydrogen fluoride solution containing more hydrogen fluoride than is present in a constant boiling mixture thereof, maintaining the temperature of the emerging vapors at about 19 to 20° C., condensing the emerging vapors and collecting the anhydrous fluoride until the temperature in the still bottom reaches about 110° C.

13. The process of producing substantially anhydrous hydrogen fluoride which comprises generating a crude gas containing less than about 50% of water vapor by weight by the action of sulfuric acid upon a fluorine containing mineral and passing this gas through an iron still, the temperature of which is maintained at or slightly below the boiling point of the constant boiling mixture and through an iron fractionating device so controlled that the temperature of the exit gas shall be the boiling point of anhydrous hydrogen fluoride, the said crude gas being passed directly from the iron reaction chamber to the still.

WILLIAM S. CALCOTT.
LEE CONE HOLT.